United States Patent
Lin et al.

(10) Patent No.: US 9,354,663 B2
(45) Date of Patent: May 31, 2016

(54) PORTABLE ELECTRONIC DEVICE

(71) Applicant: FIH (Hong Kong) Limited, Kowloon (HK)

(72) Inventors: I-Chin Lin, New Taipei (TW); Hsiu-Fu Li, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 49 days.

(21) Appl. No.: 14/304,154

(22) Filed: Jun. 13, 2014

(65) Prior Publication Data

US 2014/0368995 A1 Dec. 18, 2014

(30) Foreign Application Priority Data

Jun. 17, 2013 (TW) ............................. 102121435 A

(51) Int. Cl.
*G06F 1/16* (2006.01)

(52) U.S. Cl.
CPC ............ *G06F 1/1637* (2013.01); *G06F 1/1626* (2013.01)

(58) Field of Classification Search
CPC combination set(s) only.
See application file for complete search history.

(56) References Cited

U.S. PATENT DOCUMENTS

| 7,885,059 | B2* | 2/2011 | Kim | G02F 1/133308 16/382 |
| 2011/0228458 | A1* | 9/2011 | Richardson | H04M 1/0252 361/679.01 |
| 2013/0134848 | A1* | 5/2013 | Chu | G06F 1/1626 312/265 |
| 2014/0091686 | A1* | 4/2014 | Pegg | H04M 1/0252 312/222 |
| 2014/0246965 | A1* | 9/2014 | Windeballe | B29C 45/16 312/223.1 |

\* cited by examiner

*Primary Examiner* — Lisa Lea Edmonds
(74) *Attorney, Agent, or Firm* — Novak Druce Connolly Bove + Quigg LLP

(57) ABSTRACT

A portable electronic device includes a first module, a second module, a housing, and a plurality of fasteners. The first module is configured to be coupled to a first side of the main housing, and the second module is configured to be coupled to a second side of the main housing opposite the first side. The fasteners configured to secure the first module to the main housing and the second module to the main housing. One of the main housing or the first module defines a plurality of recesses, the other one of the main housing or the first module comprises a plurality of hooks configured to latch to a respective recesses.

16 Claims, 6 Drawing Sheets

PORTABLE ELECTRONIC DEVICE

FIELD

The subject matter herein generally relates to portable electronic devices.

BACKGROUND

Portable electronic devices usually include a display module and housings all of which can be assembled together by adhesive.

BRIEF DESCRIPTION OF THE DRAWINGS

Implementations of the present technology will now be described, by way of example only, with reference to the attached figures, wherein.

DETAILED DESCRIPTION

Figure 1:
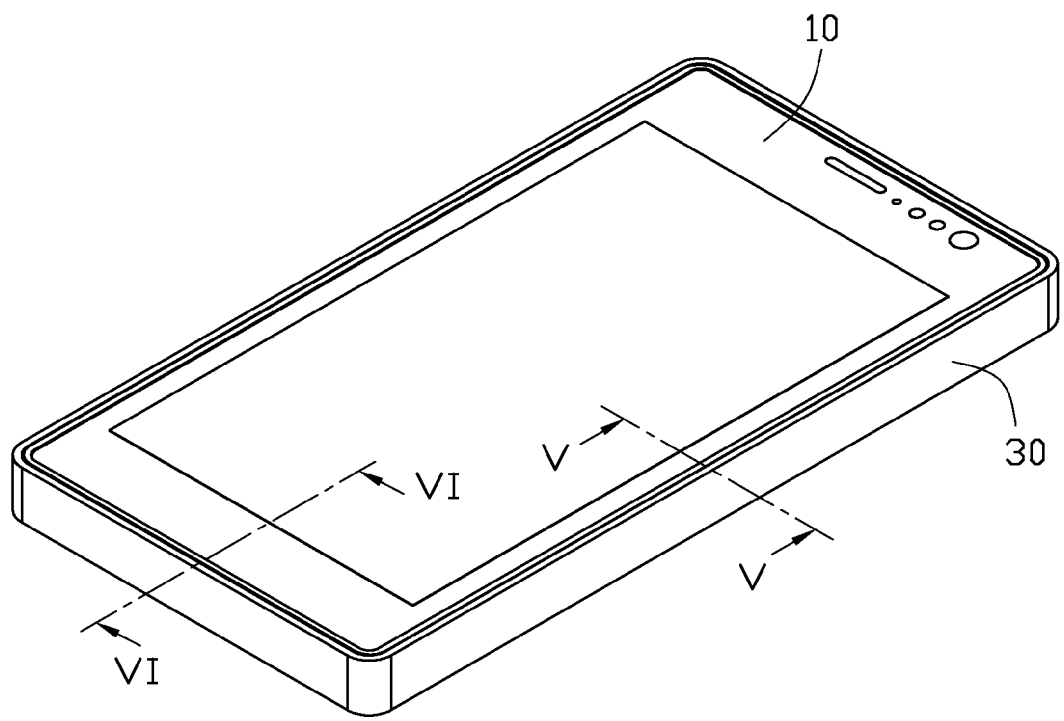
FIG. 1 is an isometric view of an embodiment of a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series and the like.

FIG. 1 illustrates an embodiment of a portable electronic device 100. The portable electronic device 100 comprises (includes, but is not limited to) a first module 10 and a main housing 30.

Figure 2:
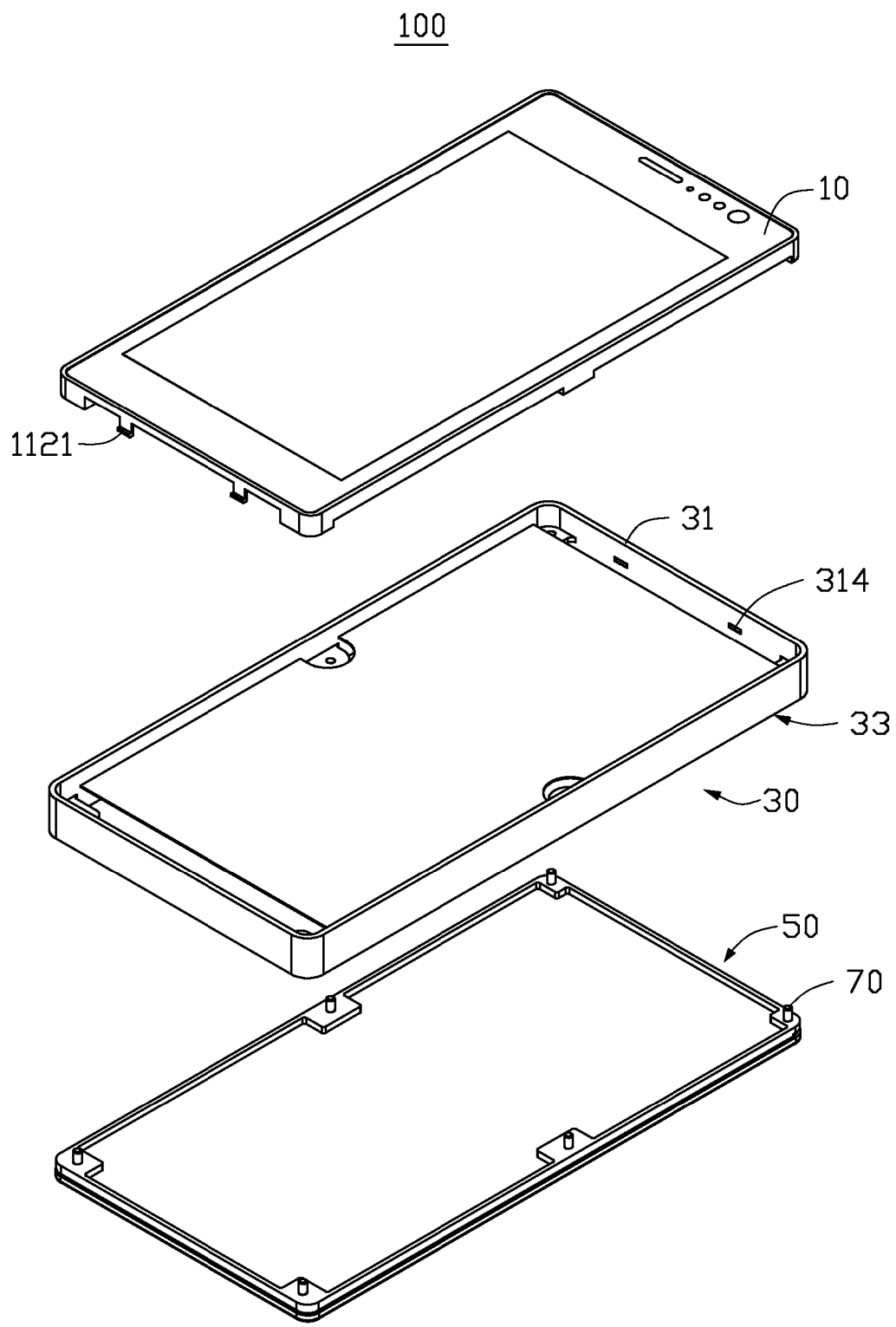
FIG. 2 is a partially disassembled isometric view of the portable electronic device of FIG. 1.

FIG. 2 illustrates a partially disassembled view of the portable electronic device 100 of FIG. 1. The portable electronic device 100 further includes a second module 50 and a plurality of fasteners 70. The first module 10 is mounted to a first side 31 of the main housing 30, and the second module 50 is mounted to a second side 33 of the main housing 30 opposite to the first module 10. The fasteners 70 secure the first module 10, the second module 50, and the main housing 30 together (also see FIG. 5). One of the main housing 30 or the first module 10 defines a plurality of recesses 314. The other one of the main housing 30 or the first module 10 comprises a plurality of hooks 1121 latching with the recesses 314 (see also FIG. 6).

Figure 3:
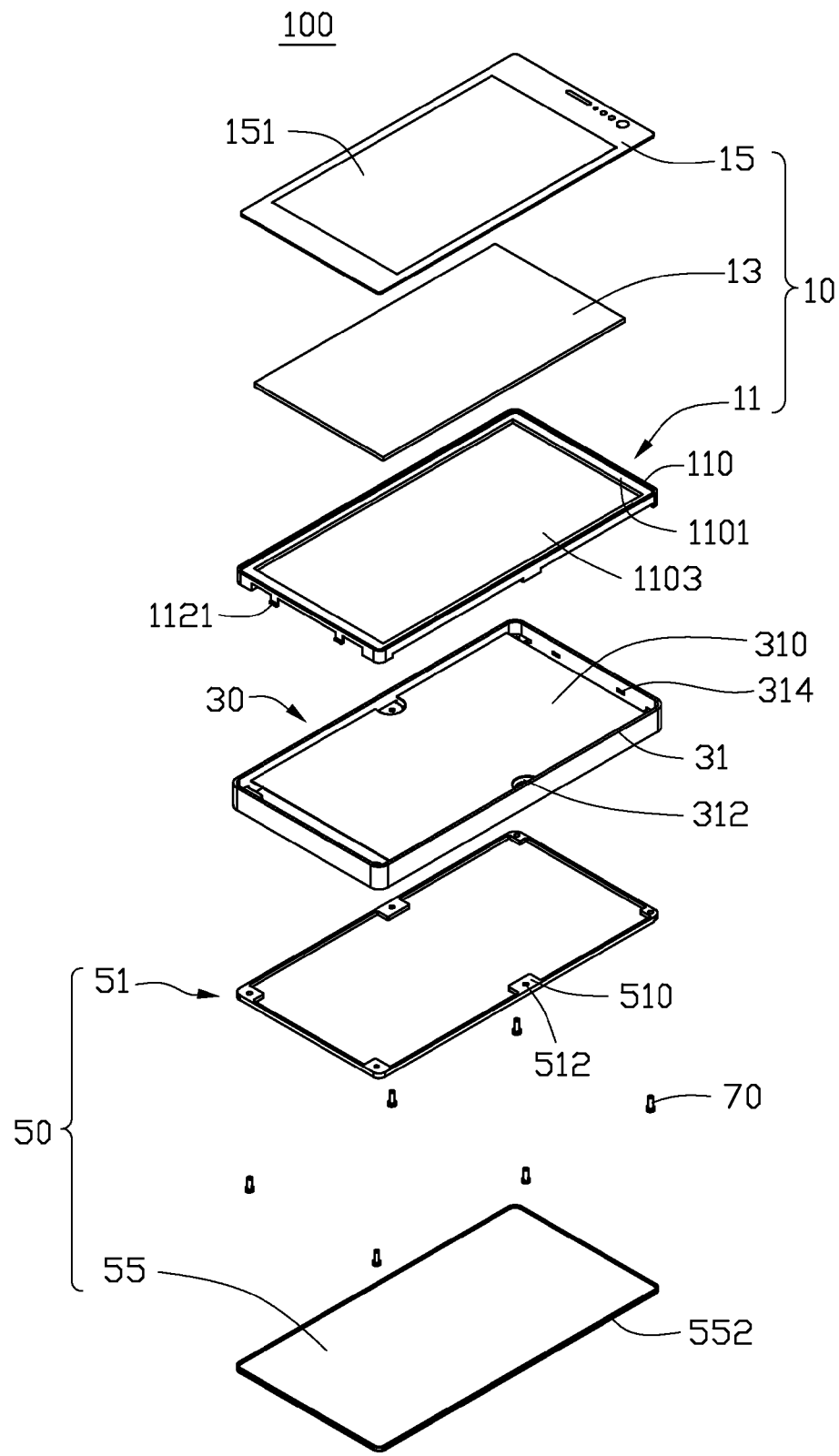
FIG. 3 is an exploded isometric view of the portable electronic device of FIG. 1.
Figure 4:
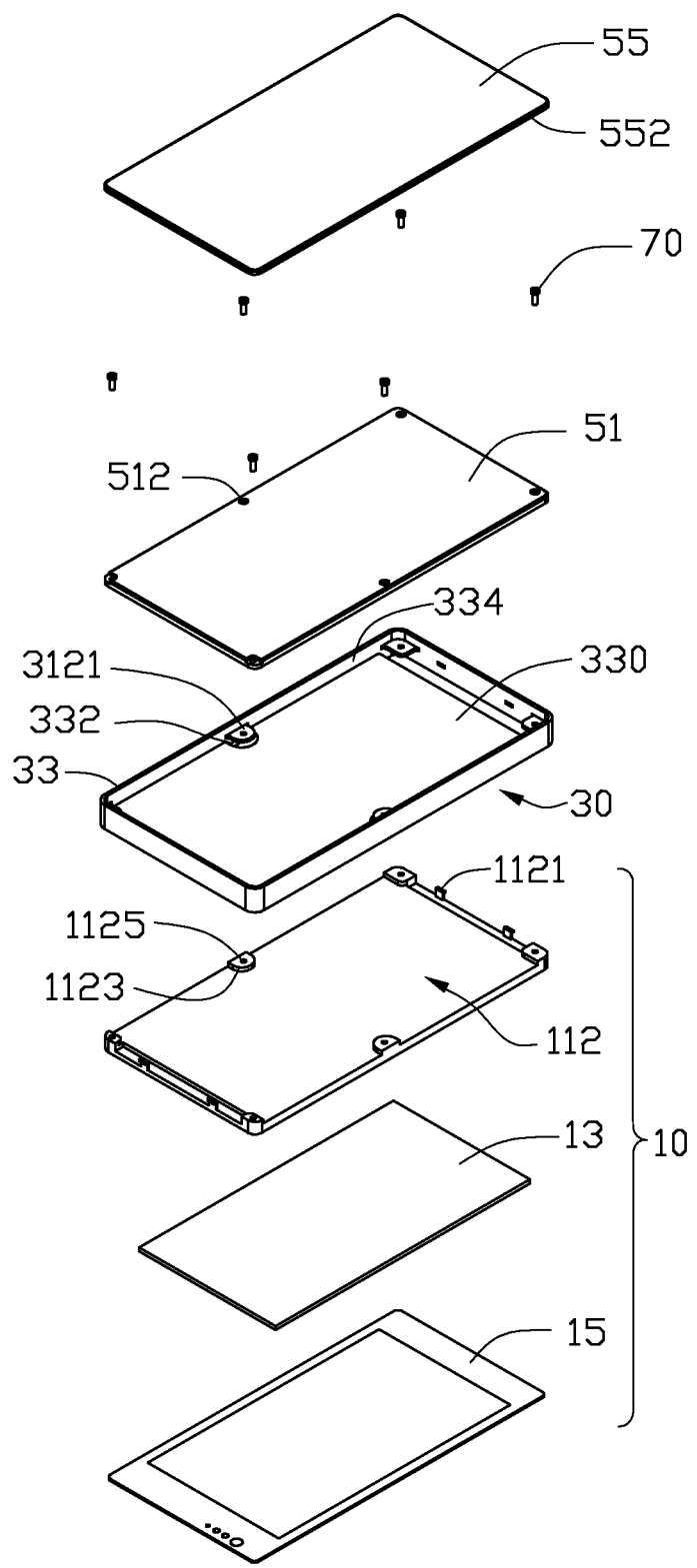
FIG. 4 is similar to FIG. 3, but shown the portable electronic device from another angle.

FIGS. 3-4 illustrate exploded views of the portable electronic device of FIG. 1, respectively showing the portable electronic device 100 from two different angles. The first module 10 includes a front frame 11, a display module 13, and a front cover 15, the front frame 11 includes a first surface 110 defining a first groove 1101, and a second groove 1103 which is recessed in a bottom wall of the first groove 1101. The display module 13 is received in the second groove 1103. The front cover 15 is received in the first groove 1101 and covers on the display module 13. The front cover 15 defines a display window 151 aligning with the display module 13.

The main housing 30 comprises a first compartment 310 defined in the first side 31, and a second compartment 330 defined in the second side 33, the front frame 11 is received in the first compartment 310, and the second module 50 is received in the second compartment 330.

In one embodiment, the hooks 1121 protrude from the first module 10, the recesses 314 are defined in the main housing 30. In particular, the hooks 1121 protrude from two ends of the front frame 11, the recesses 314 are defined in two sidewalls of the first compartment 310.

The front frame 11 includes a second surface 112 opposite to the first surface 110. The second surface 112 includes a plurality of first mounting blocks 1123 protruding therefrom. A bottom wall of the first compartment 310 defines a plurality of first receiving grooves 312 arranged according to the first mounting blocks 1123. A bottom wall of the second compartment 330 defines a plurality of second receiving grooves 332 each of which aligns with one of the first receiving grooves 312. The second module 50 comprises a back frame 51 and a back cover 55. The back frame 51 includes a plurality of second mounting blocks 510 arranged according to the second receiving grooves 332. The first mounting blocks 1123 and the second mounting blocks 510 are positioned in the first receiving grooves 312 and the second receiving grooves 332 respectively (see also FIG. 5). In one embodiment, the first mounting blocks 1123 are positioned around an edge of the second surface 112 of the front frame 11, the first receiving grooves 312 are positioned adjacent to sidewalls of the first compartment 310.

Each first mounting block 1123 defines a first hole 1125, each first receiving groove 312 defines a second hole 3121 connected between the first receiving groove 312 and the second receiving groove 332, each second mounting block 510 defines a third hole 512 through the back cover 51.

Figure 5:
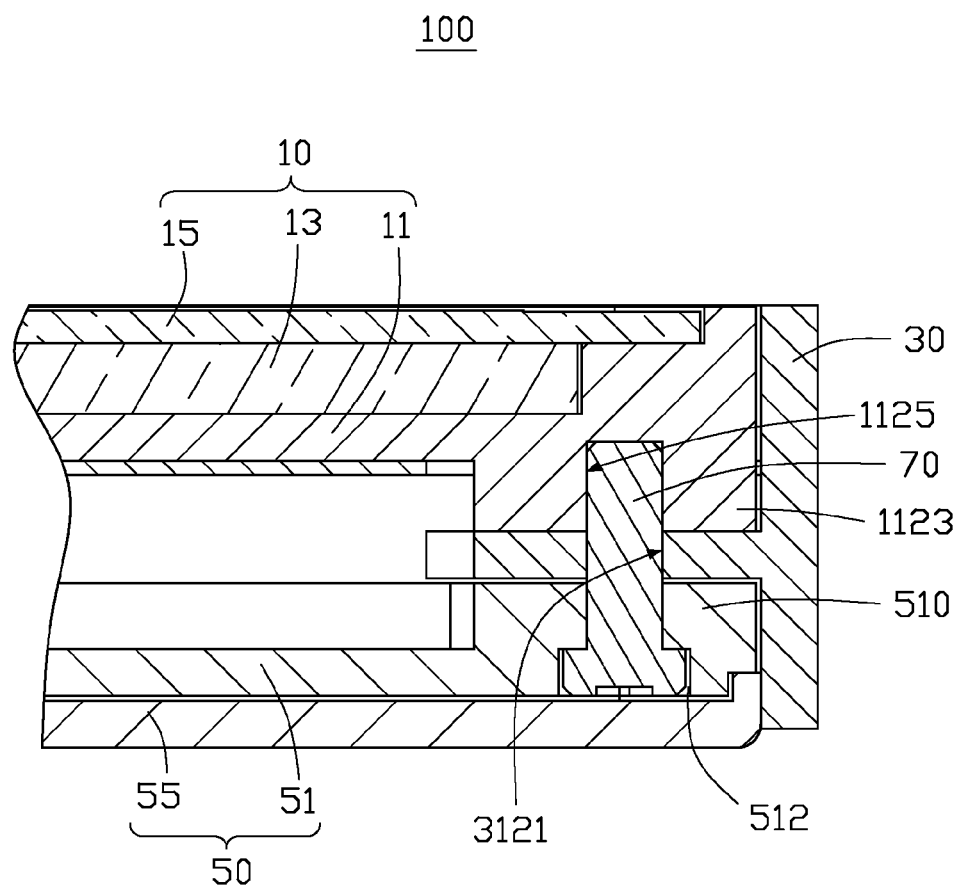
FIG. 5 is a cross-sectional view of the portable electronic device of FIG. 1 along line V-V.

FIG. 5 is a cross-sectional view of the portable electronic device of FIG. 1 along line V-V. As shown in FIG. 5, each fastener 70 can pass through the third hole 512, the second hole 3121 and the first hole 1125 successively. In one embodiment, the fastener 70 is a screw.

Figure 6:
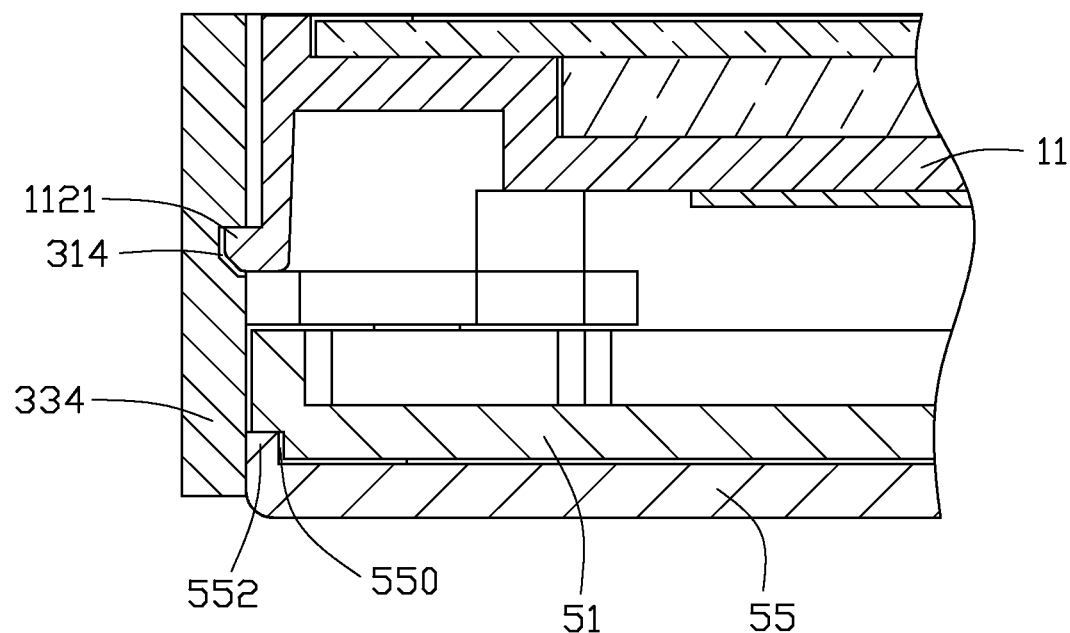
FIG. 6 is an enlarged, cross-sectional view of the portable electronic device of FIG. 1 along line VI-VI.

FIG. 6 is a cross-sectional view of the portable electronic device of FIG. 1 along line VI-VI. A slot 550 is formed between the back frame 51 and a peripheral wall 334 (also see FIG. 4) of the second compartment 330. The back cover 55 has a flange 552 (also see FIGS. 3-4) protruding from an edge, the back cover 55 covers a surface of the back frame 51 opposite to the front frame 11 with the flange 552 received in the slot 550.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A portable electronic device, comprising:
a main housing;
a first module configured to be coupled to a first side of the main housing;
a second module configured to be coupled to a second side of the main housing opposite the first side; and
a plurality of fasteners configured to secure the first module to the main housing and the second module to the main housing;
wherein one of the main housing or the first module defines a plurality of recesses, the other one of the main housing or the first module comprises a plurality of hooks configured to latch to a respective recess; the first module comprises a front frame, a display module, and a front cover; the front frame comprises a first surface, the first surface defines a first groove and a second groove which is recessed in a bottom wall of the first groove; the display module is configured to be received in the second groove; and the front cover is configured to be received in the first groove and covers the display module.

2. The portable electronic device of claim 1, wherein the main housing comprises a first compartment defined in the first side, and a second compartment defined in the second side; the front frame is configured to be received in the first compartment, the second module is configured to be received in the second compartment.

3. The portable electronic device of claim 2, wherein the hooks protrude from two ends of the front frame, and the recesses are defined in two sidewalls of the first compartment.

4. The portable electronic device of claim 2, wherein the front frame comprises a second surface opposite the first surface, the second surface comprises a plurality of first mounting blocks protruding therefrom; the first compartment comprises a first bottom wall defining a plurality of first receiving grooves arranged according to the first mounting blocks; the second compartment comprises a second bottom wall defining a plurality of second receiving grooves each of which aligns with one of the first receiving grooves; the second module comprises a back frame having a plurality of second mounting blocks arranged according to the second receiving grooves; the first mounting blocks and the second mounting blocks are positioned in the first receiving grooves and the second receiving grooves respectively.

5. The portable electronic device of claim 4, wherein each of the plurality of first mounting blocks defines a first hole, each of the plurality of first receiving grooves defines a second hole connected between the first receiving groove and the second receiving groove, each of the plurality of second mounting blocks defines a third hole through the back cover, each of the plurality of fasteners configured to pass through the third hole, the second hole and the first hole successively.

6. The portable electronic device of claim 4, wherein the first mounting blocks are positioned around an edge of the second surface of the front frame, the first receiving grooves are positioned adjacent to sidewalls of the first compartment.

7. The portable electronic device of claim 4, wherein the second module further comprises a back cover, a slot is formed between the back frame and a peripheral wall of the second compartment, the back cover has a flange protruding from an edge thereof, the back cover covers a surface of the back frame opposite to the front frame with the flange received in the slot.

8. The portable electronic device of claim 1, wherein each of the plurality of fasteners is a screw.

9. A portable electronic device, comprising:
a main housing;
a first frame configured to be coupled to a first side of the main housing and comprising a first surface, the first surface defining a first groove and a second groove which is recessed in a bottom wall of the first groove;
a second frame configured to be coupled to a second side of the main housing opposite the first side;
a plurality of fasteners configured to secure the first frame to the main housing and the second frame to the main housing;
a display module configured to be received in the second groove; and
a front cover configured to be received in the first groove and covers the display module;
wherein one of the main housing or the first frame defines a plurality of recesses, the other one of the main housing or the first frame comprises a plurality of hooks configured to latch to a respective recesses.

10. The portable electronic device of claim 9, wherein the main housing comprises a first compartment defined in the first side, and a second compartment defined in the second side, the front frame is configured to be received in the first compartment, the second module is configured to be received in the second compartment.

11. The portable electronic device of claim 10, wherein the hooks protrude from two ends of the front frame, and the recesses are defined in two sidewalls of the first compartment.

12. The portable electronic device of claim 10, wherein the front frame comprises a second surface opposite the first surface, the second surface comprises a plurality of first mounting blocks protruding therefrom; the first compartment comprises a first bottom wall defining a plurality of first receiving grooves arranged according to the first mounting blocks; the second compartment comprises a second bottom wall defining a plurality of second receiving grooves each of which aligns with one of the first receiving grooves; the back frame having a plurality of second mounting blocks arranged according to the second receiving grooves; the first mounting blocks and the second mounting blocks are positioned in the first receiving grooves and the second receiving grooves respectively.

13. The portable electronic device of claim 12, wherein each of the plurality of first mounting blocks defines a first hole, each of the plurality of first receiving grooves defines a second hole connected between the first receiving groove and the second receiving groove, each of the plurality of second mounting blocks defines a third hole through the back cover, each of the plurality of fasteners configured to pass through the third hole, the second hole and the first hole successively.

14. The portable electronic device of claim 12, wherein the first mounting blocks are positioned around an edge of the second surface of the front frame, the first receiving grooves are positioned adjacent to sidewalls of the first compartment.

15. The portable electronic device of claim 12, further comprising a back cover, wherein a slot is formed between the back frame and a peripheral wall of the second compartment, the back cover has a flange protruding from an edge thereof, the back cover covers a surface of the back frame opposite to the front frame with the flange received in the slot.

16. The portable electronic device of claim 9, wherein each of the plurality of fasteners is a screw.

* * * * *